（12）United States Patent
Buchbjerg et al.

(10) Patent No.: US 12,078,143 B2
(45) Date of Patent: Sep. 3, 2024

(54) METHOD FOR MANUFACTURING A STRUCTURAL ELEMENT OF A WIND TURBINE BLADE, METHOD FOR MANUFACTURING A WIND TURBINE BLADE, STRUCTURAL ELEMENT OF A WIND TURBINE BLADE AND WIND TURBINE BLADE

(71) Applicant: Siemens Gamesa Renewable Energy A/S, Brande (DK)

(72) Inventors: Bjarke Buchbjerg, Aalborg (DK); Gabriele Chiesura, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 57 days.

(21) Appl. No.: 17/764,255

(22) PCT Filed: Sep. 30, 2020

(86) PCT No.: PCT/EP2020/077316
§ 371 (c)(1),
(2) Date: Mar. 28, 2022

(87) PCT Pub. No.: WO2021/069272
PCT Pub. Date: Apr. 15, 2021

(65) Prior Publication Data
US 2022/0349377 A1 Nov. 3, 2022

(30) Foreign Application Priority Data
Oct. 9, 2019 (EP) ..................................... 19202234

(51) Int. Cl.
*F03D 1/06* (2006.01)
*B29C 65/54* (2006.01)
(Continued)

(52) U.S. Cl.
CPC .......... *F03D 1/0675* (2013.01); *B29C 65/542* (2013.01); *B29K 2105/0097* (2013.01); *B29L 2031/085* (2013.01); *F05B 2230/23* (2013.01)

(58) Field of Classification Search
CPC . B29C 65/483; B29C 65/4835; B29C 65/542; B29C 66/02241; B29C 66/02242;
(Continued)

(56) References Cited

U.S. PATENT DOCUMENTS 11,149,708 B2 * 10/2021 Rasmussen ........... F03D 1/0633
11,306,697 B2 * 4/2022 Girolamo .............. F03D 1/0675
(Continued)

FOREIGN PATENT DOCUMENTS

CN 101457781 A 6/2009
CN 101900088 A 12/2010
(Continued)

OTHER PUBLICATIONS

PCT International Search Report and Written Opinion of International Searching Authority mailed Dec. 15, 2020 corresponding to PCT International Application No. PCT/EP2020/077316 filed Sep. 30, 2020.

*Primary Examiner* — Dapinder Singh
(74) *Attorney, Agent, or Firm* — Schmeiser, Olsen & Watts LLP

(57) ABSTRACT

A method for manufacturing a structural element of a wind turbine blade including forming of at least one injection hole in at least one laminate provided on a top side of a core material of a first portion and a second portion of the structural element and a bottom side of a core material of the first portion and the second portion, so that the at least one injection hole is fluidically connected to the cavity. Further, injecting adhesive through the injection hole into the cavity, curing the adhesive injected into the cavity and thereby
(Continued)

forming a joint between an end of the core material of the first portion and an end of the core material of the second portion. Further, a method for manufacturing a wind turbine blade and the structural element, the wind turbine blade is also provided.

19 Claims, 12 Drawing Sheets

(51) Int. Cl.
*B29K 105/00* (2006.01)
*B29L 31/08* (2006.01)

(58) Field of Classification Search
CPC ............ B29C 66/1142; B29C 66/1162; B29C 66/12261; B29C 66/324; B29C 66/43; B29C 66/721; B29C 66/7212; B29C 66/727; B29D 99/0028; B29K 2105/0097; B29L 2031/085; F03D 1/0675; F05B 2230/23; Y02E 10/72; Y02P 70/50
See application file for complete search history.

(56) References Cited

U.S. PATENT DOCUMENTS

| | | |
|---|---|---|
| 2009/0155084 A1 | 6/2009 | Livingston et al. |
| 2010/0132884 A1 | 6/2010 | Baehmann et al. |
| 2011/0210464 A1* | 9/2011 | Burchardt ........... B29C 33/0061 264/101 |
| 2012/0051937 A1 | 3/2012 | Grase et al. |
| 2014/0140855 A1* | 5/2014 | Arendt ................. F03D 1/0675 29/889.71 |
| 2014/0169978 A1* | 6/2014 | Livingston ............ F03D 1/0675 264/263 |
| 2014/0322025 A1 | 10/2014 | Barnhart et al. |
| 2016/0146185 A1 | 5/2016 | Yarbrough et al. |
| 2016/0312762 A1 | 10/2016 | Quiring et al. |
| 2017/0122287 A1 | 5/2017 | Dobbe et al. |
| 2017/0211543 A1 | 7/2017 | Sandercock et al. |
| 2017/0234296 A1 | 8/2017 | Garm et al. |
| 2018/0216601 A1 | 8/2018 | Yarbrough et al. |

FOREIGN PATENT DOCUMENTS

| | | |
|---|---|---|
| CN | 102372085 A | 3/2012 |
| CN | 105619844 A | 6/2016 |
| CN | 106662070 A | 5/2017 |
| CN | 106715097 A | 5/2017 |
| CN | 108661854 A | 10/2018 |
| EP | 2740583 A1 | 6/2014 |
| EP | 2746573 A2 | 6/2014 |
| EP | 3065934 A1 | 9/2016 |
| EP | 2591230 B1 | 6/2017 |
| EP | 3747639 B1 | 12/2020 |
| TW | 201504518 A | 2/2015 |
| WO | 2019120417 A1 | 6/2019 |

* cited by examiner

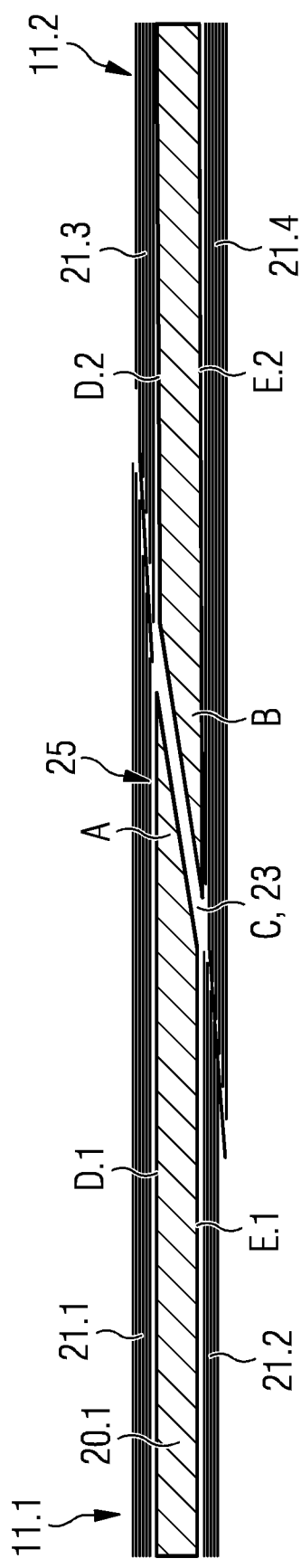
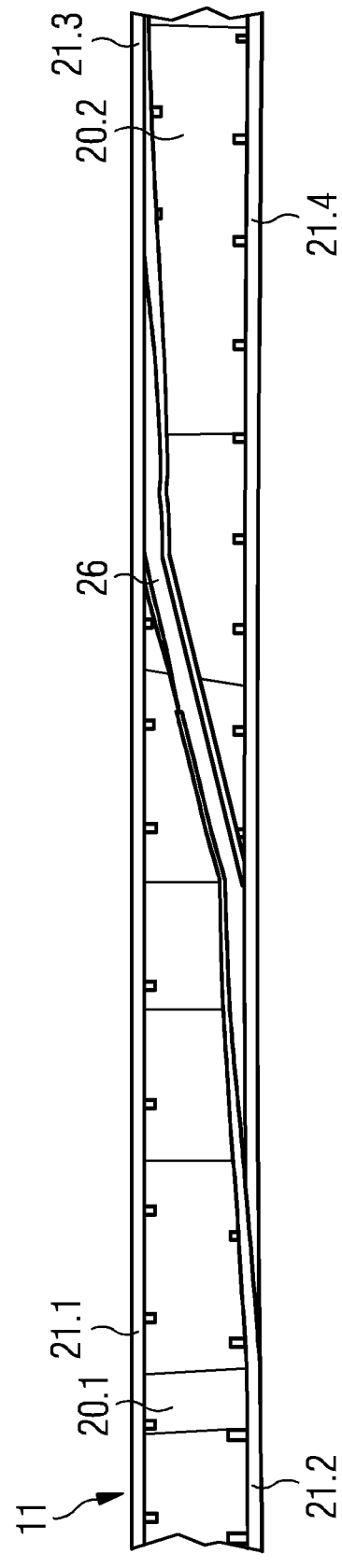

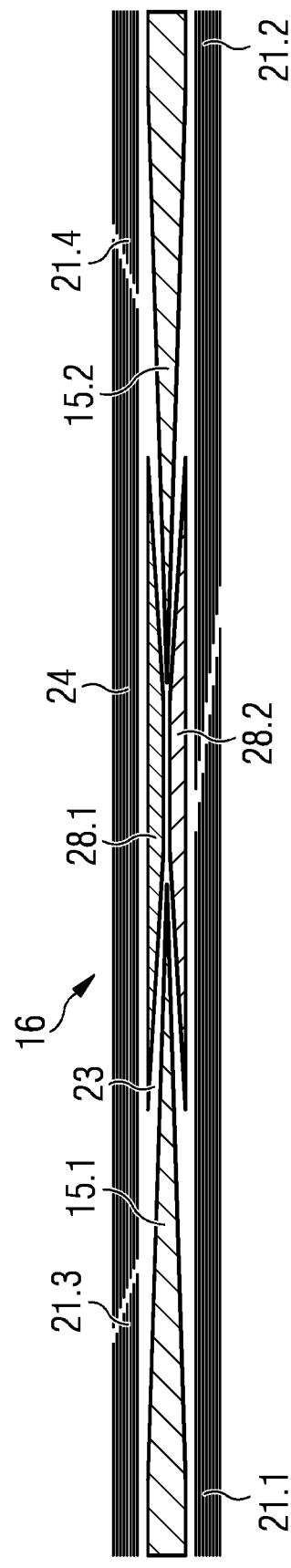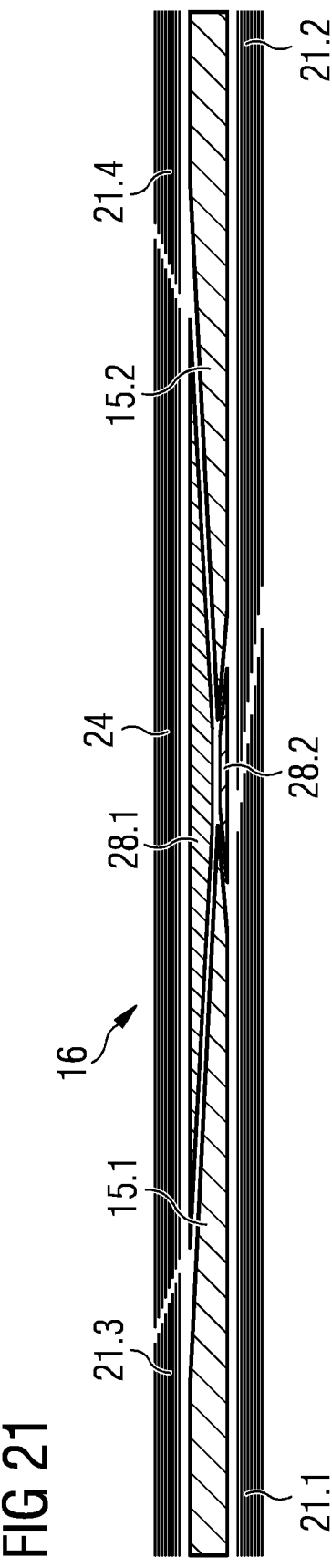

METHOD FOR MANUFACTURING A STRUCTURAL ELEMENT OF A WIND TURBINE BLADE, METHOD FOR MANUFACTURING A WIND TURBINE BLADE, STRUCTURAL ELEMENT OF A WIND TURBINE BLADE AND WIND TURBINE BLADE

CROSS-REFERENCE TO RELATED APPLICATIONS

This application claims priority to PCT Application No. PCT/EP2020/077316, having a filing date of Sep. 30, 2020, which claims priority to EP Application No. 19202234.1, having a filing date of Oct. 9, 2019, the entire contents both of which are hereby incorporated by reference.

FIELD OF TECHNOLOGY

The following relates to a method for manufacturing a structural element of a wind turbine blade, a method for manufacturing a wind turbine blade, a structural element of a wind turbine blade and a wind turbine blade.

BACKGROUND

One way to produce more power using a wind turbine under given wind conditions is to increase the size of the wind turbine blades. However, the manufacturing of wind turbine blades and their transportation to wind harvesting sites is particularly difficult for large wind turbine blade sizes. Therefore, wind turbine blades are, for example, manufactured portion-wise and joined on-site. The wind turbine portions are typically connected to each other either by bonding, bolting or by a combination of both. However, the joints have to be sufficiently strong to withstand the forces acting on the wind turbine blade during operation of the wind turbine.

SUMMARY

An aspect relates to provide an improved method for manufacturing a structural element of a wind turbine blade, an improved method for manufacturing a wind turbine blade, an improved structural element of a wind turbine blade and an improved wind turbine blade, in particular by means of which the wind turbine blade may be manufactured in a quick and cost-effective yet sufficiently strong manner.

According to a first aspect of embodiments of the invention, the aspect is solved by a method for manufacturing a structural element of a wind turbine blade, comprising the steps of:
(a) providing a first portion of the structural element and a second portion of the structural element, whereby each of the first portion and the second portion comprise a core material,
(b) arranging an end of the core material of the first portion to face an end of the core material of the second portion, whereby a gap is formed between the end of the core material of the first portion and the end of the core material of the second portion,
(c) providing laminates on top sides of the core materials of the first portion and the second portion and on bottom sides of the core material of the first portion and the second portion, whereby a cavity enclosing the gap is formed between the end of the core material of the first portion, the end of the core material of the second portion and at least two of the laminates,
(d) forming at least one injection hole in at least one of the laminates, so that the at least one injection hole is fluidically connected to the cavity, and
(e) injecting adhesive through the at least one injection hole into the cavity, curing the adhesive injected into the cavity and thereby forming a structural joint between the end of the core material of the first portion and the end of the core material of the second portion.

In particular due to the provision of the at least one injection hole and the injection of adhesive into the cavity, the structural elements of the wind turbine blade may be manufactured in a quick and cost-effective yet sufficiently strong manner.

The laminates may be stacks of layers of fibrous composite materials. Such layers may be oriented with principal material directions in various geometric directions to satisfy loading and/or thermal requirements of the laminate. Thus, such a composite laminate is an assembly of layers of fibrous composite materials joined together to provide required engineering properties, including in-plane stiffness, bending stiffness, strength, and coefficient of thermal expansion. Fibers of the layers may be embedded in a polymeric, metallic, or ceramic matrix material. As fibers, cellulose, glass, carbon, aramid, natural, boron, and/or silicon carbide fibers may be used, for example. For example, epoxies, polyimides, polyurethanes, polyesters, aluminum, titanium, and/or alumina may be used for the matrix material.

In particular, the first portion of the structural element and the second portion of the structural element may be provided with laminate being arranged on the top sides of the core materials of the first portion and the second portion and laminate being arranged on the bottom sides of the core materials of the first portion and the second portion. In other words, the laminate on the top sides and the bottom sides of the core materials may be provided before the ends of the core materials are arranged facing each other.

The at least one injection hole may be formed in the at least one laminate by means of drilling or laser cutting, for example. The at least one injection hole may in particular be formed in a proximity of the cavity, in particular the gap. In particular, multiple injection holes may be formed in at least one or multiple of the laminates, so that the multiple injection holes are fluidically connected to the cavity. The adhesive may then be injected through the multiple injection holes into the cavity. It is possible to provide the multiple injection holes in a pattern. An example of a pattern may be a line along which at least three, at least four or more injecting holes are arranged at distance from one another. The distance may be an equidistant distance between each of the injection holes. Further, there may be at least two, at least three or more adjacent lines with at least three, at least four or more injecting holes provided at distance from one another. The adjacent lines may be arranged at a distance from one another in a direction transverse, in particular perpendicular, to their extension. Injection holes arranged along one line may further be offset from injection holes arranged along an adjacent line of that line.

The adhesive may be a self-curing adhesive. In particular, the adhesive may be an adhesive curing at room temperature or at a temperature below room temperature. Alternatively, the adhesive may be an adhesive curing at a temperature above room temperature, in which case it must be heated to be cured. Thus, the step of curing the adhesive may comprise heating the adhesive. Heating of the adhesive may be additionally or alternatively performed prior to injecting the adhesive to decrease its viscosity. It is preferable to use an adhesive of low viscosity to improve flow of the adhesive through the cavity. That adhesive may be heated to further decrease its viscosity. The adhesive may be an epoxy adhesive or a polyurethane adhesive, for example.

As core material, wood, balsa, PET foam and/or PVC foam may be used, for example. The same or different material may be used for the core material of the first portion and the second portion.

The ends of the core materials may be longitudinal ends of the core material. Such longitudinal ends are ends of sides of the core material having the largest extension of all sides of the core material in any direction of the core material.

According to the described method of manufacturing the structural element of embodiments of the invention, a first portion and a second portion are joined together. However, there may be further portions, such as a third portion, fourth portion and so on joined according to the method of manufacturing the structural element of embodiments of the invention. Such further portions may be joined with other portions simultaneously or consecutively.

It is preferred, that the joint is a scarf joint or a butt joint. The scarf joint or butt joint are still provided with the gap between the ends of the core materials. In a butt joint, one of the ends of the core materials may be provided with a larger cross section than the other one of the ends of the core material. Thereby, the cavity may run along the bottom side and/or top side of one of the ends of the core material. Thus, the adhesive will also be located at the bottom side and/or top side of one of the ends of the core material and further strengthen the joint between the ends of the core materials. Further, the joint may be a double scarf joint or a double butt joint. In such an arrangement, two scarf joints or two butt joints are provided, which has the advantage of taking up manufacturing imperfections.

It is further preferred, that at least one of the laminates is tapered at its end, so that it forms a lip. By means of the lip it is possible to connect, in particular form-fit, a laminate provided on one of the core materials with a laminate provided on another one of the core materials. Therefore, in particular, at least two of the laminates facing each other may be correspondingly tapered at their ends. They may be connected to each other by means of a scarf joint. Thereby, stress distribution from one laminate to the other laminate may be improved.

Moreover, it is preferred, that at least one of the laminates extends beyond the end of the core material on which it is provided. In particular, the laminate extending beyond the end of its core material may be arranged underneath the bottom side of the core material facing its core material or above the top side of the core material facing its core material. Thereby, a larger cavity extending in between the laminate extending beyond the end of the core material and the laminate being opposite thereof may be provided. Further, this measure provides more adhering surface. Thus, the joint may be strengthened.

Also, it is preferred, that during the injection of the adhesive, an adhesive stopper is provided adjacent to the laminate provided on the bottom side of the core material of the first portion and the laminate provided on the bottom side of the core material of the second portion. In particular, the adhesive stopper may be provided contacting the laminate provided on the bottom side of the core material of the first portion and the laminate provided on the bottom side of the core material of the second portion. The laminate on the bottom side of the core material of the first portion may be tapered at its end, so that it forms the lip. Thereby, the adhesive may be effectively stopped from leaving the cavity during injection and curing. The adhesive stopper may have a round shape, in particular convex shape, towards the cavity, thereby improving the stress distribution at an area of transition of the adhesive to the laminates.

It is further preferred, that the step of providing the laminates includes
overlaminating a laminate on the laminates provided on the top sides of the core materials of the first portion and the second portion, so that the overlaminated laminate connects the laminates provided on the top sides of the core materials of the first portion and the second portion with each other, and/or
overlaminating a laminate on the laminates provided on the bottom sides of the core materials of the first portion and the second portion, so that the overlaminated laminate connects the laminates provided on the bottom sides of the core materials of the first portion and the second portion with each other.

By overlaminating the laminates with a laminate, the strength of the joint may further be strengthened. The at least one injection hole may be provided only in the overlaminated laminate, only in the laminate provided on the bottom sides or the top sides or in both.

It is also preferred, that the method comprises the further step of arranging at least one intermediate piece connecting the end of the core material of the first portion with the end of the core material of the second portion. In this case, the cavity is formed between the ends of the core materials of the first portion and the second portion, the laminates and the intermediate piece. The intermediate piece may also comprise core material, in particular the same core material as used for the first portion and the second portion. By means of the intermediate piece, the joint may be manufactured particularly strong.

In addition, it is preferred, that the at least one intermediate piece comprises spacers on its surface, whereby the spacers create space for the cavity between the intermediate piece and the end of the core material of the first portion and between the intermediate piece and the end of the core material of the second portion. The spacers may in particular be arranged at distance from one another. The spacers may be arranged along at least one or multiple adjacent lines along the intermediate piece. The spacers may comprise a substantially circular shape, for example. The spacers may further be arranged so that they create space between the intermediate piece and at least one of the laminates.

Moreover, it is preferred, that the at least one intermediate piece is tapered at its ends, and that the end of the core material of the first portion and the end of the core material of the second portion are tapered correspondingly to the ends of the intermediate piece for fitting, in particular form-fitting, therewith. Thereby, particularly strong scarf joints are provided at both ends of the intermediate piece.

Further, it is preferred, that ends of the at least one intermediate piece are being fitted into corresponding recesses of the end of the core material of the first portion and the end of the core material of the second portion. The recess may, for example, have a V-Shape and the ends of the intermediate piece may have a thereto corresponding triangular shape or in other words the shape of a spike, for insertion into the V-shaped recesses. Each of the V-shaped recess and the spike shaped end of the intermediate pieces provides two tapered surfaces, by means of which the joint may be further strengthened.

It is also preferred, that two separate intermediate pieces are being arranged to connect the end of the core material of the first portion with the end of the core material of the second portion. The two separate intermediate pieces may be of equal or different size. Thereby, the overall tapered surface of the joint may be enlarged and the joint strengthened even further.

Further it is preferred, that the first portion and the second portion are shell portions, spar web portions and/or spar cap portions. Thereby, two or more shell portions joined with each other according to embodiments of the invention may form the shell of the wind turbine blade, two or more spar web portions joined with each other according to embodiments of the invention may form the spar web of the wind turbine blade and/or two or more spar cap portions joined with each other according to embodiments of the invention may form the spar cap of the wind turbine blade.

According to a second aspect of embodiments of the invention, the aspect is solved by a method for manufacturing a wind turbine blade, whereby the method comprises the method for manufacturing a structural element of the wind turbine blade according to embodiments of the invention, by means of which at least two of a shell, a spar web and a spar cap of the wind turbine blade are manufactured and joined together using overlamination and/or adhesive injection. In particular, the overlamination may be performed such that laminate or in other words overlaminate is overlaminated on top of at least two laminates of the at least two of the shell, spar web and/or spar cap, each of the at least two laminates being provided on a separate one of the at least two of the shell, spar web and/or spar cap. In particular, the adhesive injection may be provided by means of forming injection holes in at least one of the laminates of the at least two of the shell, spar web and/or spar cap and/or the overlaminated laminate and injecting adhesive through the injection holes and curing the injected adhesive.

According to a third aspect of embodiments of the invention, the aspect is solved by structural element of a wind turbine blade manufactured by means of the method for manufacturing the structural element of the wind turbine blade according to embodiments of the invention, whereby the structural element is a shell, a spar web or a spar cap. Such a structural element has the injection holes provided in the at least one laminate and the cavity filled with the cured adhesive. Thereby, a structural element of a wind turbine blade consisting of at least two portions is provided with a joint of high strength.

According to a fourth aspect of embodiments of the invention, the aspect is solved by a wind turbine blade comprising at least one structural element according to embodiments of the invention. In particular, the wind turbine blade may comprise the shell, the spar web and the spar cap formed according to the method of manufacturing the structural element of the wind turbine blade of embodiments of the invention.

BRIEF DESCRIPTION

Some of the embodiments will be described in detail, with reference to the following figures, wherein like designations denote like members, wherein:

FIG. 6 shows a side perspective schematic view on a setup for performing the method of manufacturing a structural element of the wind turbine blade of FIG. 2 according to a second embodiment of the invention;

FIG. 7 shows a side perspective sectional cut through a structural element similar to the one of FIG. 6;

Figure 2:
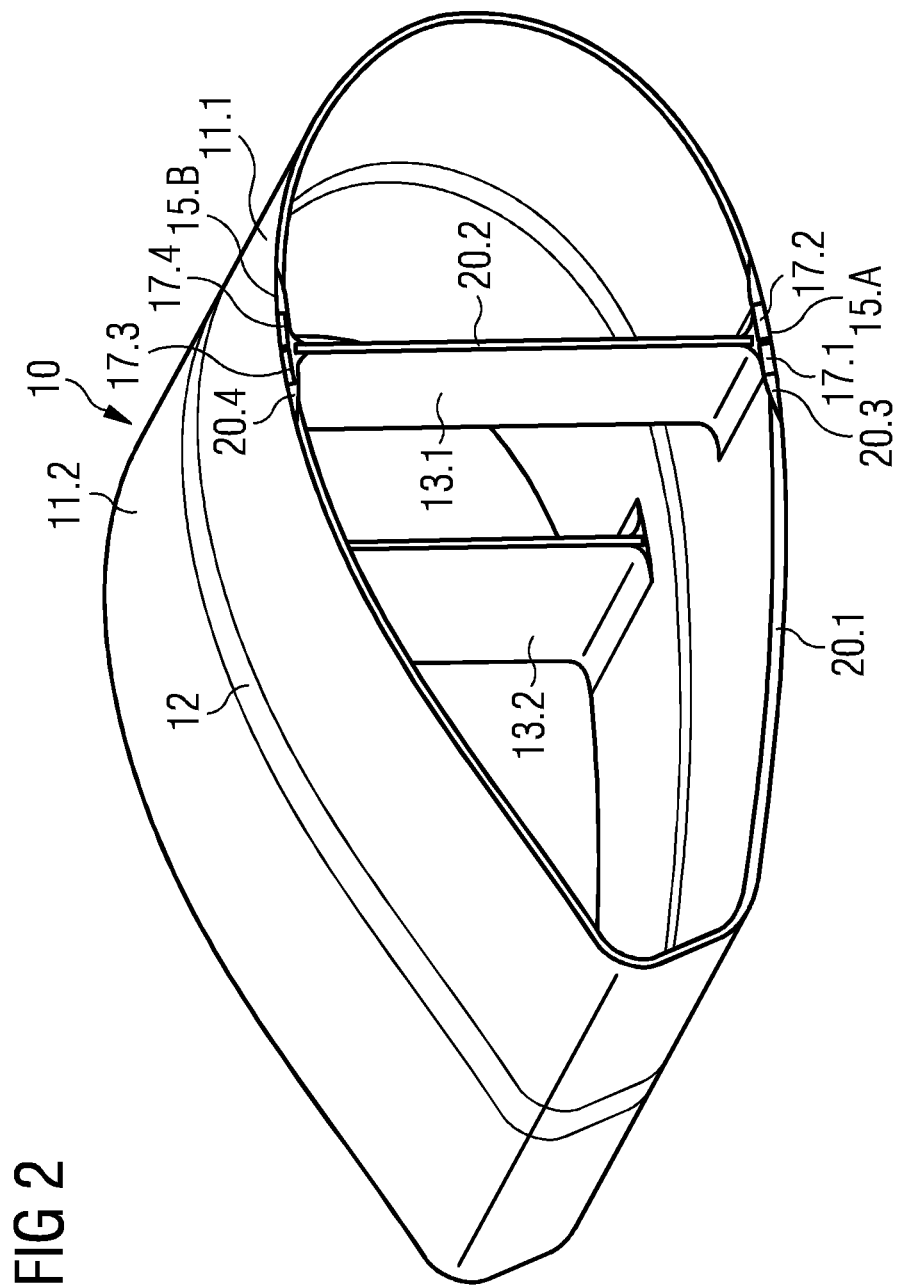
FIG. 2 shows a partial side perspective view of the wind turbine blade of the wind turbine of FIG. 1 and according to an embodiment of the invention.
Figure 17:
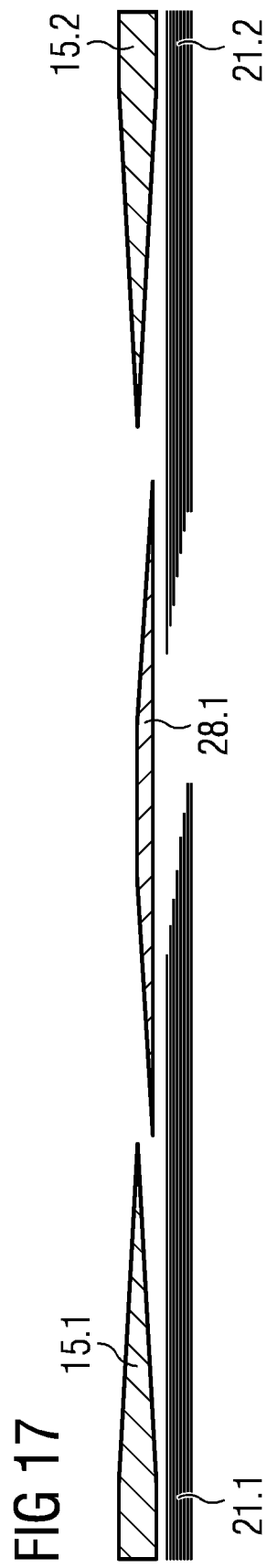
FIG. 17 shows a side perspective schematic view on a setup for performing a first phase of the method of manufacturing a structural element of the wind turbine blade of FIG. 2 according to a fifth embodiment of the invention.

FIG. 20 shows the side perspective schematic view of FIG. 17 showing a fourth phase of the method of manufacturing the structural element of the wind turbine blade of FIG. 2 according to the fifth embodiment of the invention; and FIG. 21 shows a side perspective schematic view on a structural element manufactured according to a method of manufacturing the structural element of the wind turbine blade of FIG. 2 according to a sixth embodiment of the invention.

DETAILED DESCRIPTION

Figure 1:
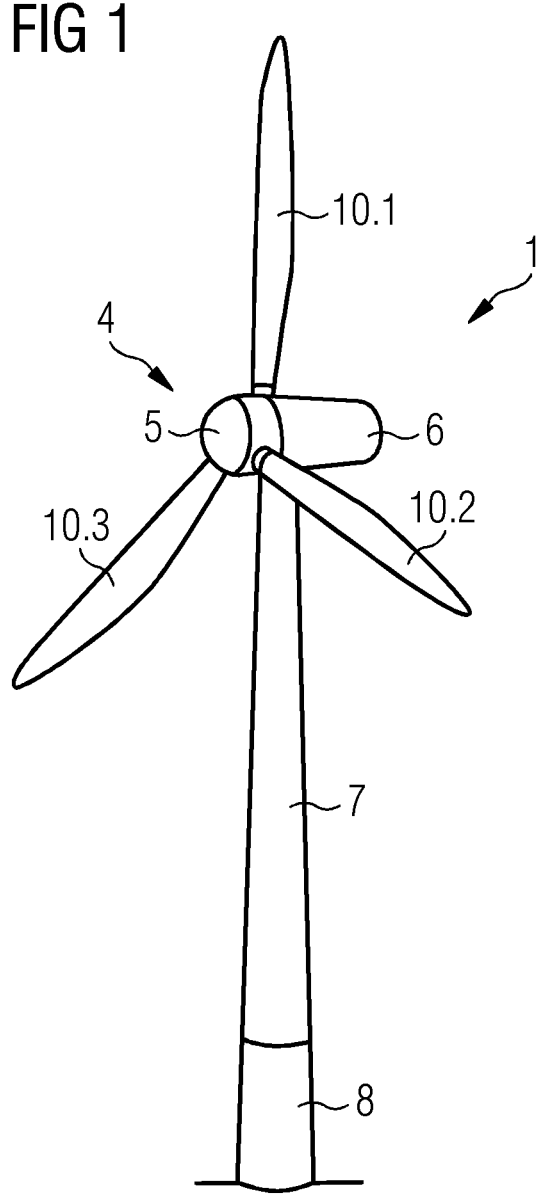
FIG. 1 shows a side perspective view on a wind turbine.

FIG. 1 shows a wind turbine 1 according to an exemplary embodiment. The wind turbine 1 comprises a rotor 4 having three wind turbine blades 10.1, 10.2, 10.3 connected to a hub 5. However, the number of wind turbine blades 10 may be at least one wind turbine blade 10, two wind turbine blades 10 or more than three wind turbine blades 10 and chosen as required for a certain setup of a wind turbine 1. The hub 5 is connected to a generator (not shown) arranged inside a nacelle 6. During operation of the wind turbine 1, the blades 10 are driven by wind to rotate and the wind's kinetic energy is converted into electrical energy by the generator in the nacelle 6. The nacelle 6 is arranged at the upper end of a tower 7 of the wind turbine 1. The tower 7 is erected on a foundation 8 such as a monopile or tripile. The foundation 8 is connected to and/or driven into the ground or seabed.

FIG. 2 shows a partial side perspective view of a wind turbine blade 10 of the wind turbine 1 of FIG. 1 and according to an embodiment of the invention. In this illustration, the wind turbine blade 10 is sectionally cut from two sides running perpendicular to a longitudinal axis of the wind turbine blade 10. The wind turbine blade 10 comprises a shell 11 made from a first shell portion 11.1 and a second shell portion 11.2, which are joined together by means of a shell joint 12.

Further, the wind turbine blade 10 comprises a spar web 13. The spar web 13 is shown having a first spar web portion 13.1 and a second spar web portion 13.2, whereby the first spar web portion 13.1 and the second spar web portion 13.2 are separated from one another by means of a gap. The gap has the purpose of enabling joining the first shell portion 11.1 with the second shell portion 11.2 by means of the shell joint 12. The gap may afterwards be closed by means of a third spar web portion 13, which is not shown in this illustration.

Moreover, the part of the wind turbine blade 10 comprises two spar caps 15.A, 15.B. The two spar caps 15.A, 15.B are connected to one another by means of the spar web 13. Each of the spar caps 15.A, 15.B is also formed by means of two spar cap portions 15.1, 15.2 joined together by means of a spar cap joint 16. However, this cannot be taken from this illustration but from the FIGS. 9 to 11 and 14 to 21.

The shell 11 and the spar web 13 comprise a core material 20.1, 20.2 being covered by a laminate 21 (referenced in FIGS. 3 to 7). The spar caps 15.A, 15.B also comprise a core material 20.3, 20.4 covered by a laminate 21 (referenced in FIGS. 9 to 11 and 14 to 21). Further, each of the two spar caps 15.A, 15.B comprises two reinforcement profiles 17.1, 17.2, 17.3, 17.4 embedded in the respective core material 20.3, 20.4. The reinforcement profiles 17.1, 17.2, 17.3, 17.4 may be pultruded profiles, in particular stacks of pultruded profiles, having glass fibers or carbon fibers, for example.

The wind turbine blade 10 as shown in FIG. 2 has a spar of an I-beam type. However, it is also possible to provide the wind turbine blade 10 with a spar of a different type, such as a box type. In a box type, there are four spar caps 15, whereby two pairs of the four spar caps 15 are connected by means of separate spar webs 13.

Figure 3:
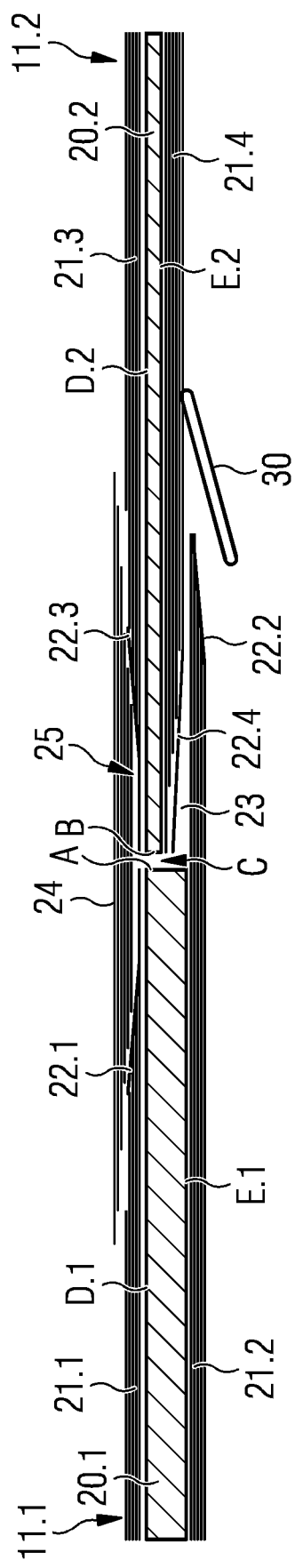
FIG. 3 shows a side perspective schematic view on a setup for performing the method of manufacturing a structural element of the wind turbine blade of FIG. 2 according to a first embodiment of the invention.

FIG. 3 shows a side perspective schematic view on a setup for performing the method of manufacturing a structural element 11 of the wind turbine blade 10 of FIG. 2 according to a first embodiment of the invention. In this first embodiment, the structural element 11 is the shell 11 or a part of the shell 11 of the wind turbine blade 10, in the following referred to as the shell 11.

The shell 11 comprises the first shell portion 11.1 and the second shell portion 11.2. On a top side D.1 of the first shell portion 11.1 a first laminate 21.1 made from composite material is laminated. This first laminate 21.1 is tapered at its end, thereby forming a first lip 22.1. The first laminate 21.1 terminates at the end A of the first core material 20.1 of the first shell portion 11.1, on which it is provided. Further, a top side D.2 of the second shell portion 11.2 is provided with a third laminate 21.3 made from composite material. This third laminate 21.3 is tapered at its end, thereby forming a third lip 22.3. The third laminate 21.3 terminates at the end B of the second core material 20.2 of the second shell portion 11.2, on which it is provided. Also, the bottom sides E.1, E.2 of the first shell potion 11.1 and the second shell portion 11.2 are laminated with respective second and fourth laminates 21.2, 21.4 made from composite material. The fourth laminate 21.4 is also tapered at its end, thereby forming a fourth lip 22.4. The fourth laminate 21.3 also terminates at the end B of the second core material 20.2, on which it is provided. However, the second laminate 21.1 provided on the first core material 20.1 does not terminate at the end A of the first core material 20.1 but extends beyond the end A of the first core material 20.1 and underneath, in particular in parallel to, the second core material 20.2. The second laminate 21.2 is also tapered at its end and thereby forms a second lip 22.2.

The first core material 20.1 and 20.2 are arranged facing each other and such that they form a but joint having a gap C in between them. The first core material 20.1 is provided with a greater thickness at its end A than the second core material 20.2.

After providing and arranging the core materials 20.1, 20.2 with their laminates 21.1, 21.2, 21.3, 21.4 as described above, a fifth laminate 24, which may also be referred to as an overlaminate 24, is overlaminated on top of the first laminate 21.1 and the third laminate 21.3. The overlaminate 24 is tapered at both of its end corresponding for fitting to the lips 22.1, 22.3 of the laminates 21.1, 21.3. Thereby, a form-fitting and high-strength connection is provided between both of the laminates 21.1, 21.3 and by means of these between the core materials 20.1, 20.2.

After providing the overlaminate 24, at least one injection hole 25 is formed in at least one, two or all of the first laminate 21.1, the third laminate 21.3 and the overlaminate 24 such that the at least one injection hole 25 is fluidically connected with the gap C. The gap C is included in a cavity 23 formed between all laminates 21.1, 21.2, 21.3, 21.4, 24. An adhesive stopper 30 is provided contacting the second lip 22.2 and the fourth laminate 21.4. Afterwards, an adhesive 26 (referenced in FIG. 5) is injected through the at least one injection hole 25 into the cavity 23 and cured therein. Thereby, a structural joint, the shell joint 12 as shown in FIG. 2, is formed.

Although the method of manufacturing the structural element 11 of the wind turbine blade 10 according to the first embodiment of the invention has been explained with reference to FIG. 3 with respect to the shell 11 of the wind turbine blade 10 and the shell portions 11.1, 11.2, it is possible to manufacture the spar web 13 and/or one or both of the spar caps 15.A, 15.B of the wind turbine blade 10 of FIG. 2 according to the same method.

Figure 4:
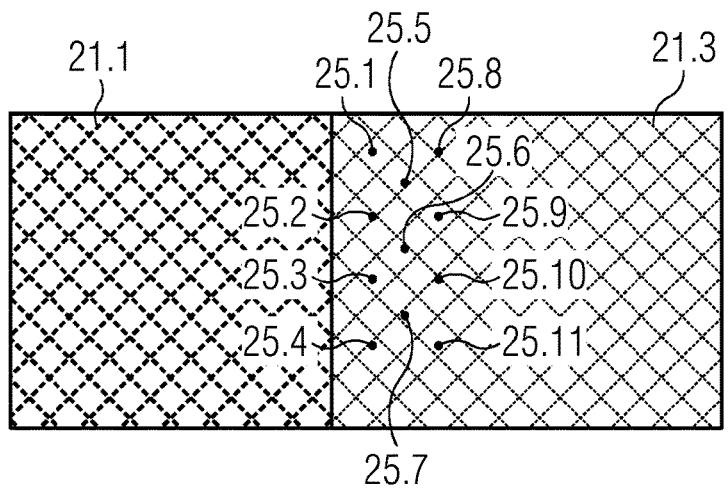
FIG. 4 shows a top view on the laminates arranged on the top sides of the core materials of the structural element shown in FIG. 3.

FIG. 4 shows a top view on the laminates 21.1, 21.3 arranged on the top sides D.1, D.2 of the core materials 20.1, 20.2 of the structural element 11 shown in FIG. 3. In this exemplary embodiment, the at least one injection hole 25 are multiple injection holes 25.1, 25.2, 25.3, 25.4, 25.5, 25.6, 25.7, 25.8, 25.9, 25.10, 25.11 formed in the third laminate 21.3. The injection holes 25.1, 25.2, 25.3, 25.4 are provided along a first line, the injection holes 25.5, 25.6, 25.7 are provided along a second line and the injection holes 25.8, 25.9, 25.10, 25.11 are provided along a third line. The first, second and third line are arranged adjacent and at distance to one another. The injection holes 25.5, 25.6, 25.8 of the second line are offset from the injection holes 25.1, 25.2, 25.3, 25.4, 25.9, 25.10, 25.11 of the first and third line.

Figure 5:
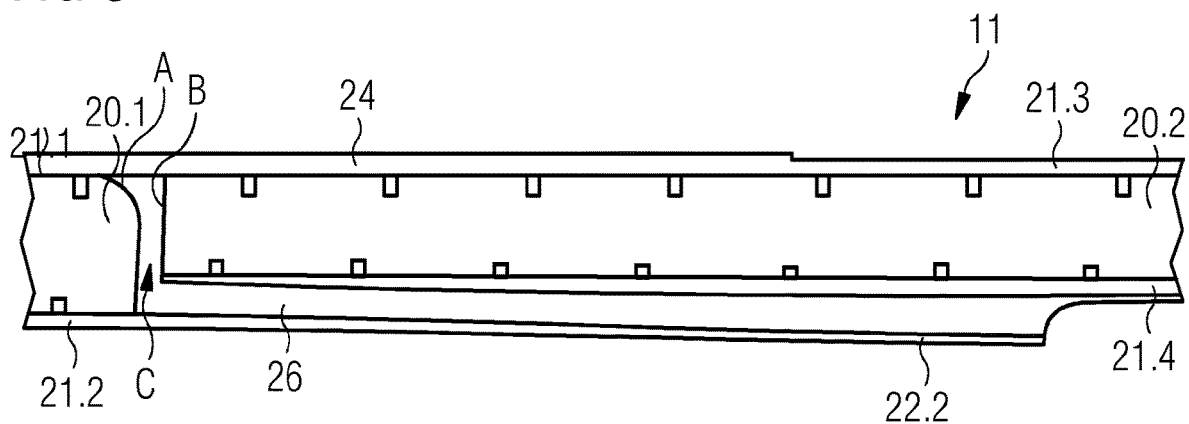
FIG. 5 shows a side perspective sectional cut through the structural element of FIG. 3.

FIG. 5 shows a side perspective sectional cut through the structural element 11 of FIG. 3 after the injected adhesive 26 has been cured and the shell joint 12 has thereby been established. The adhesive 26 is provided in the cavity 26, which essentially includes the gap C between the ends A, B of the core materials 20.1, 20.3 and a space in between the second laminate 21.2 extending beyond the end A of the first core material 20.1 and the fourth laminate 21.4. By means of the second laminate 21.2 extending beyond the end A of the first core material 20.1, a particular strong joint is provided due to the large surface area of the laminate 21.2 being adhered to the fourth laminate 21.4.

At the location at which the adhesive stopper 30 had been arranged during the injection of the adhesive 26, the cured adhesive 26 has been formed having a round shape. In particular, the cured adhesive 26 is concavely formed between the second laminate 21.2 or second lip 22.2 and the fourth laminate 21.4. This is because the adhesive stopper 30 used during the injection of the adhesive 26 has a corresponding convex surface, which is however not shown in FIG. 3. Thereby, stress distribution of the shell joint 12 between the laminates 21.2, 21.4 is improved. It is possible to provide the adhesive stopper 30 such that it is not removed after injecting the adhesive 26 or curing the adhesive 26 but remains adhered to the adhesive 26.

FIG. 6 shows a side perspective schematic view on a setup for performing the method of manufacturing the structural element 13 of the wind turbine blade 10 of FIG. 2 according to a second embodiment of the invention. In this second embodiment of the invention, the structural element 13 is the spar web 13 of the wind turbine blade 10 of FIG. 2. However, it is also possible to manufacture the shell 11 or one or both of the spar caps 15.A, 15.B of the wind turbine blade 10 of FIG. 2 according to the method of this second embodiment of the invention.

In this second embodiment, the joint 14 as spar web joint 14 is provided as a scarf joint contrary to the but joint according to the first embodiment of the invention of the method of manufacturing the structural element 11 of the wind turbine blade 10 as shown in FIGS. 3 and 5. Therefore, the core materials 20.1, 20.2 are tapered at their ends A, B. The first laminate 21.1 and the fourth laminate 21.4 extend beyond the ends A, B of their respective core material 20.1, 20.2. The second laminate 21.2 and the third laminate 21.3 terminate at the ends A, B of their respective core material 20.1, 20.2. However, this may be amended such that any other of the laminates 21.1, 21.2, 21.3, 21.4 may also extend beyond or terminate at the end A, B of its respective core material 20.1, 20.2.

Further, in contrast to the first embodiment of the invention of the method of manufacturing the structural element 11 of the wind turbine blade 10, there is no overlamination 24 in this embodiment. However, an overlamination 24 may be provided additionally on the top sides or the bottom sides of the core materials 20.1, 20.2 to further strengthen the spar web joint 14.

FIG. 7 shows a side perspective sectional cut through a structural element 13 similar to the one of FIG. 6 after the injected adhesive 26 has been cured and the spar web joint 14 thereby been established. The adhesive 26 is provided in the cavity 26, which essentially includes the gap C between the ends A, B of the core materials 20.1, 20.3 and a space in between the first lip 22.1 of the first laminate 21.1 and the third lip 22.2 of the third laminate 21.3 and a space in between the second lip 22.2 of the second laminate 21.1 and the fourth lip 22.4 of the fourth laminate 21.4. Because the respective lips 22.1, 22.2, 22.3, 22.4 are tapered towards each other, an adhesive stopper 30 is not necessary, may however be provided. In contrast to the structural element 13 formed according to FIG. 6, the ends A, B, of the core materials 20.1, 20.2 are provided with different tapering angles. That is, each of the end A, B of the core materials 20.1, 20.2 is tapered towards its respective end A, B first along a first tapering angle and afterwards along a second tapering angle, which is different from the first tapering angle. The second tapering angle is larger than the first tapering angle in this case. Thereby, it is possible to provide a space between the respective lips 22.1, 22.2, 22.3, 22.4 and thus to enlarge the cavity 23 and the strengthening of the spar web joint 14.

Figure 8:
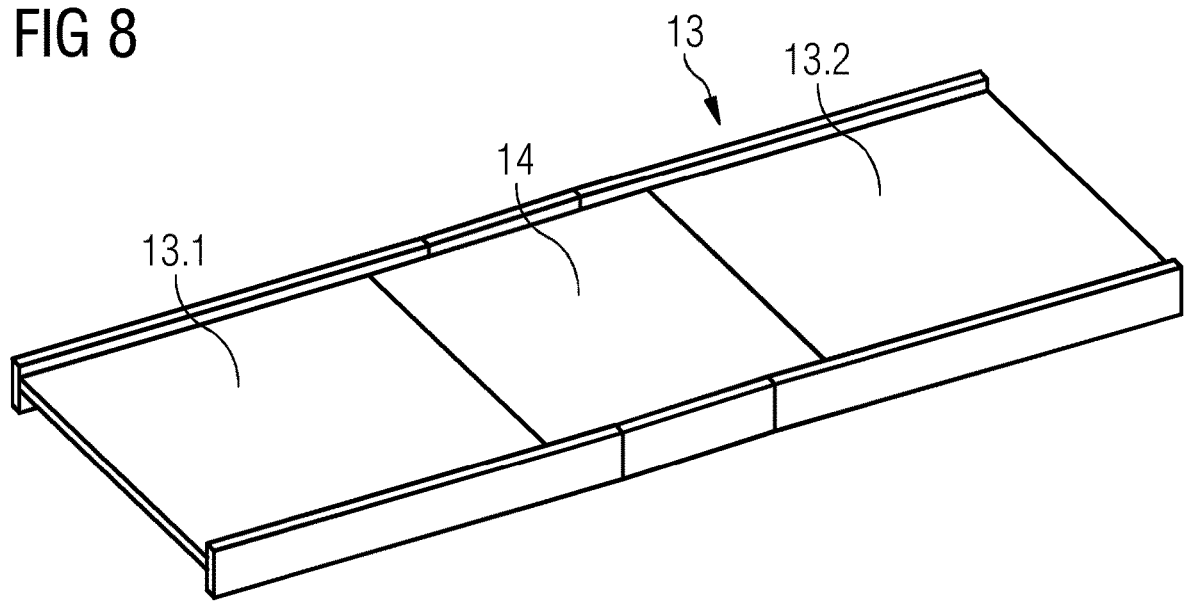
FIG. 8 shows a side perspective view on the structural element (designed as a spar web) of FIG. 6.

FIG. 8 shows a side perspective view on the structural element 13 in form of the spar web 13 of FIG. 6. Here, it can be seen that the first spar web portion 13.1 and the second spar web portion 13.2 are joined together by means of the spar web joint 14 over a large surface of the first spar web portion 13.1 and the second spar web portion 13.2.

Figure 9:
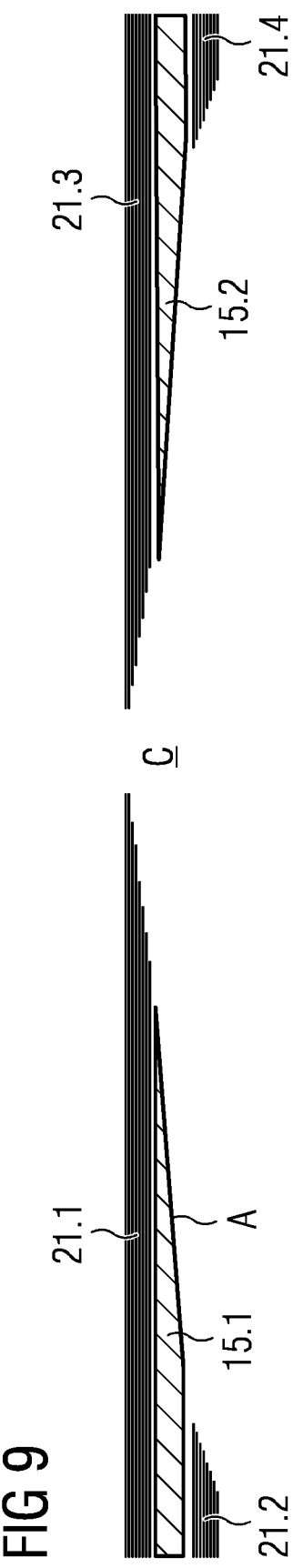
FIG. 9 shows a side perspective schematic view on a setup for performing a first phase of the method of manufacturing a structural element of the wind turbine blade of FIG. 2 according to a third embodiment of the invention.

FIG. 9 shows a side perspective schematic view on a setup for performing a first phase of the method of manufacturing the structural element 15 of the wind turbine blade 10 of FIG. 2 according to a third embodiment of the invention. In this case, the structural element 15 is one of the spar caps 15.A, 15.B of the wind turbine blade 10 of FIG. 2. However, the structural element 15 manufactured by means of the method of manufacturing it according to the third embodiment of the invention may alternatively be the shell 11 or the spar web 13. However, due to the spar cap 15 being subjected to particularly high loads, it is preferred that this method using at least one intermediate piece 28 is used for manufacturing the spar cap 15.

The first spar cap portion 15.1 and the second spar cap portion 15.2 are in the first phase of the method arranged facing each other. The spar cap portions 15.1, 15.2 are provided with respective core materials 20.1, 20.2 and at least one or at least two embedded reinforcement profiles 17, as previously explained with reference to FIG. 2.

The first spar cap portion 15.1 and the second spar cap portion 15.2 are tapered at their ends. On a top side of each of the spar cap portions 15.1, 15.2 laminates 21.1, 21.3 are provided. The laminates 21.1, 21.3 extend beyond the tapered ends A, B of the spar cap portions 15.1, 15.2 They are tapered counteractive that their tapered surface cannot be fitted onto each other. On a bottom side of each of the spar cap portions 15.1, 15.2 further laminates 21.2, 21.4 are provided. The laminates 21.2, 21.4 are terminated before the tapering of the ends A, B of the spar cap portions 15.1, 15.2. Each of the laminates 21.1, 21.2, 21.3, 21.4 is tapered at its end and thereby forms a lip (not denominated in this illustration, for reference see FIG. 3).

Figure 10:
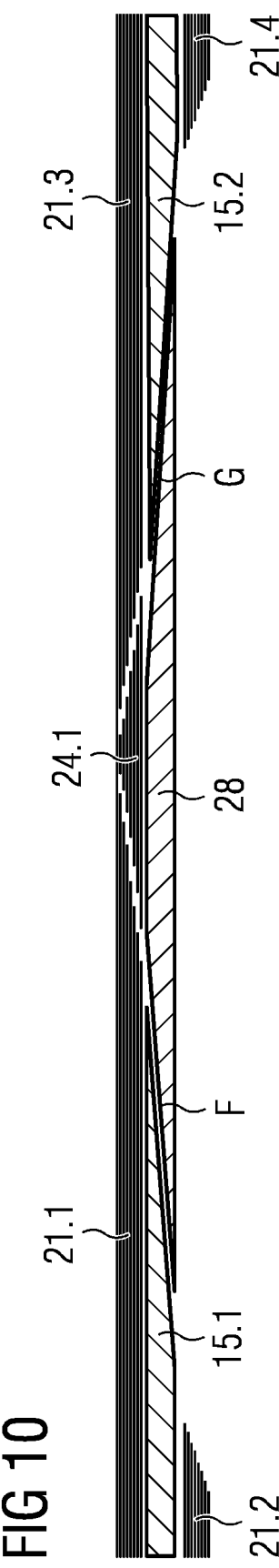
FIG. 10 shows the side perspective schematic view of FIG. 9 showing a second phase of the method of manufacturing the structural element of the wind turbine blade of FIG. 2 according to the third embodiment of the invention.

FIG. 10 shows the side perspective schematic view of FIG. 9 showing a second phase of the method of manufacturing the structural element 15 of the wind turbine blade 10 of FIG. 2 according to the third embodiment of the invention. In the second phase, a fifth laminate 24.1 or first overlaminate 24.1 is provided tapered at both of its ends so as to fit with the lips of the laminates 21.1, 21.3 provided on the top sides of the spar cap portions 15.1, 15.2.

Further, in the second phase, the intermediate piece 28 is arranged between the ends of the core materials 20.1, 20.2. The intermediate piece 28 is tapered at both of its ends F, G, which in particular are longitudinal ends F, G due to the largest extension of the intermediate piece 28 being in the direction from the one end F to the other end G, thereby forming the longitudinal direction. The ends F, G of the intermediate piece 28 and the ends A, B of the spar cap portions 15.1, 15.2 form two scarf joints.

Figure 11:
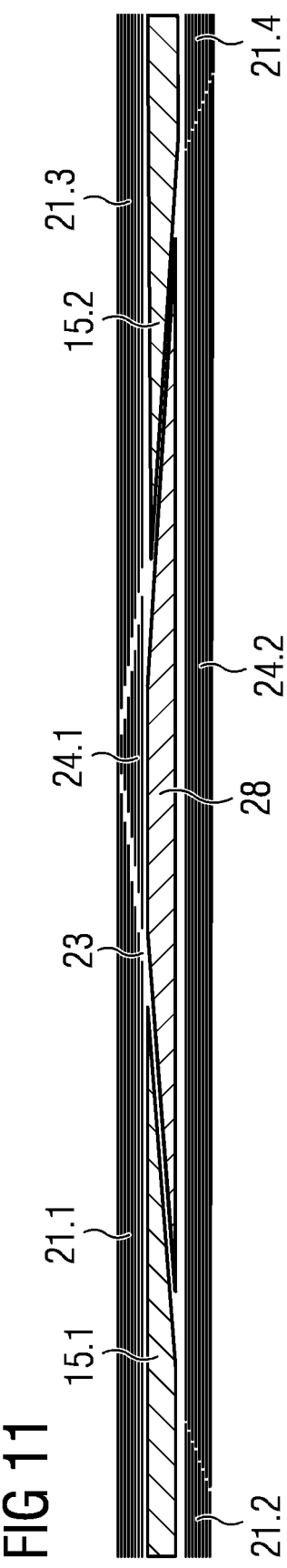
FIG. 11 shows the side perspective schematic view of FIG. 9 showing a third phase of the method of manufacturing the structural element of the wind turbine blade of FIG. 2 according to the third embodiment of the invention.

FIG. 11 shows the side perspective schematic view of FIG. 9 showing a third phase of the method of manufacturing the structural element 15 of the wind turbine blade 10 of FIG. 2 according to the third embodiment of the invention. In the third phase, a sixth laminate 24.2 or second overlaminate 24.2, which is tapered at both of its ends so as to conform to the laminates 21.2, 21.4 provided on the bottom sides of the spar cap portions 15.1, 15.2, is overlaminated on the laminates 21.2, 21.4 and the intermediate piece 28. After this, the at least one injection hole 25 may be formed in any of the laminates 21.1, 21.2, 21.3, 21.4, 24.1, 24.2 so that it connects the cavity 23 formed at least between the spar cap portions 15.1, 15.2 and the intermediate piece 28 and the adhesive 26 may be injected and cured inside the cavity 23. The cavity 23 may further be formed between the spar cap portions 15.1, 15.2, the intermediate piece 28 and the first overlaminate 24.1 and/or the second overlaminate 24.2.

Figure 12:
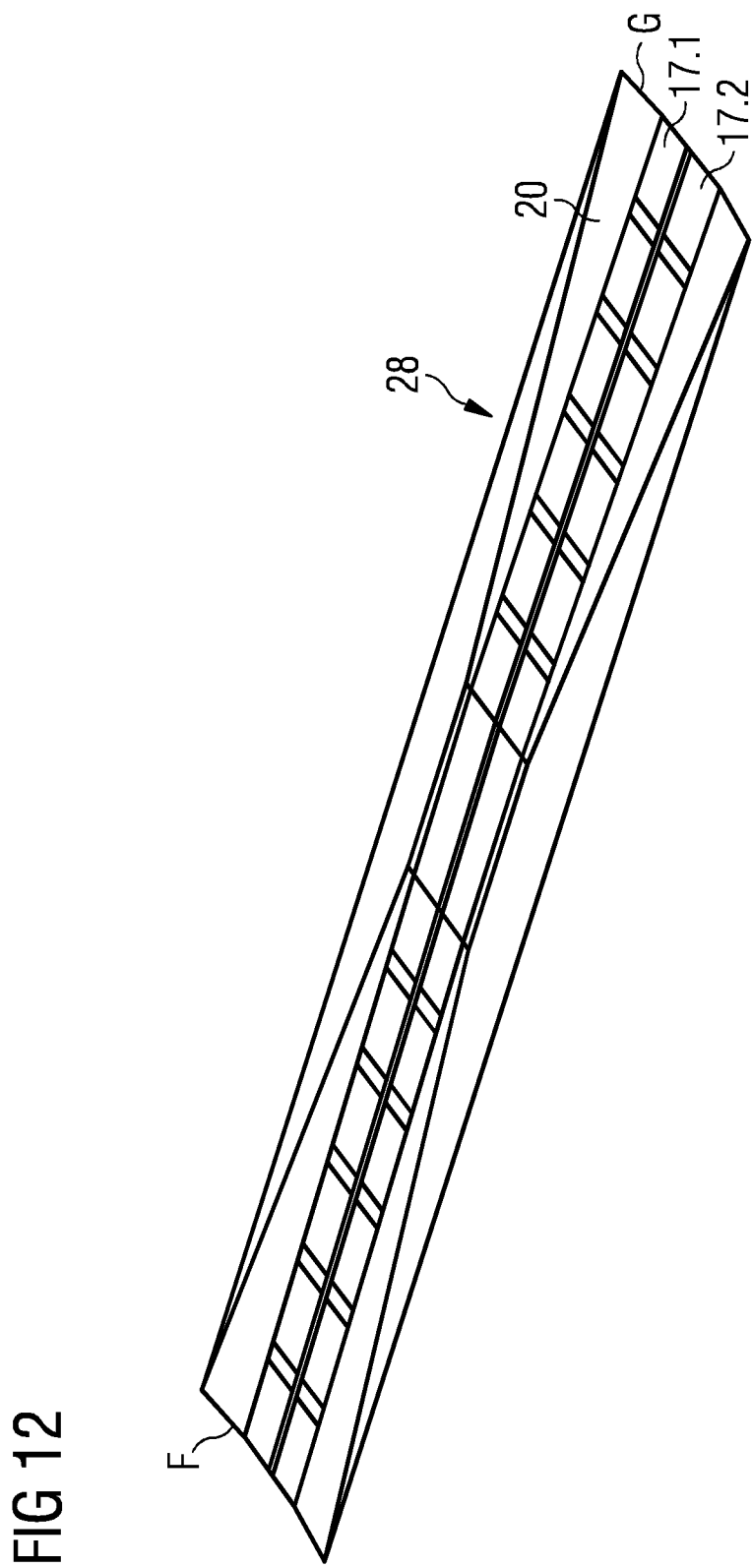
FIG. 12 shows a side perspective view on the intermediate piece used in the method of manufacturing the structural element of the wind turbine blade according to the third embodiment of the invention as shown in FIGS. 9 to 11.

FIG. 12 shows a side perspective view on the intermediate piece 28 used in the method of manufacturing the structural element 15 of the wind turbine blade 10 according to the third embodiment of the invention as shown in FIGS. 9 to 11. It can be seen that the intermediate piece 28 may not just be tapered towards its longitudinal ends F, G or the spar cap portions 15.1, 15.2 but also towards the widthwise sides along its length. Accordingly, the spar cap portions 15.1, 15.2 are tapered towards its ends not only in the length but also in their width direction and correspondingly to the intermediate piece 28 to fit therewith. The intermediate piece 28 further has a top surface, which is not tapered, and runs parallel to the bottom surface. That the top surface is not tapered facilitates the overlamination with the first overlaminate 24.1. Thereby, the intermediate piece 28 has the shape of a flat pyramidal frustum, in particular a flat square frustum or a flat hexagonal frustum. The reinforcement profiles 17 are tapered along with the core material 20 in the intermediate piece 28.

Figure 13:
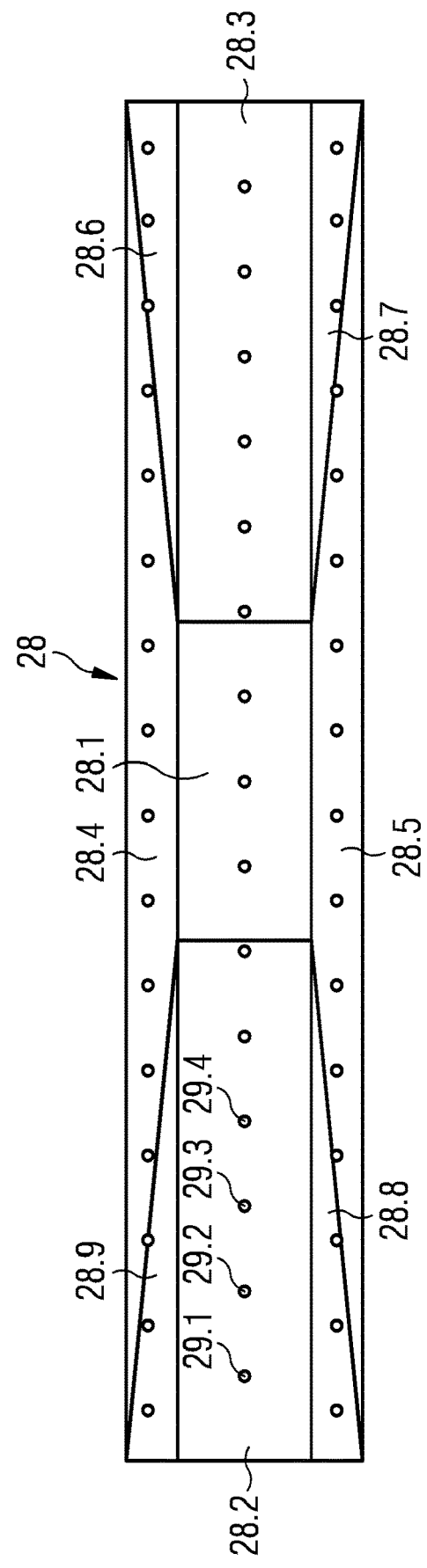
FIG. 13 shows a top view on the intermediate piece shown in FIG. 12.

FIG. 13 shows a top view on the intermediate piece 28 shown in FIG. 12. As can be taken from this illustration, the intermediate piece 28 having the flat hexagonal frustum shape with its nine top surfaces 28.1, 28.2, 28.3, 28.4, 28.5, 28.6, 28.7, 28.8, 28.9 is provided with multiple spacers 29, of which only the spacers 29.1, 29.2, 29.3, 29.4 are denominated.

By means of the spacers 29, the size and location of the cavity 23 may be controlled. For example, when the spacers 29 are provided on the surface 28.1 as shown, then the cavity 23 will include a space between the intermediate piece 28 and the first overlaminate 24.1. Moreover, when the spacers 29 are provided on the surfaces 28.1, 28.2, then the cavity 23 will include a space between the reinforcement profiles 17.1, 17.2 and the tapered ends A, B of the spar cap portions 15.1, 15.2.

Figure 14:
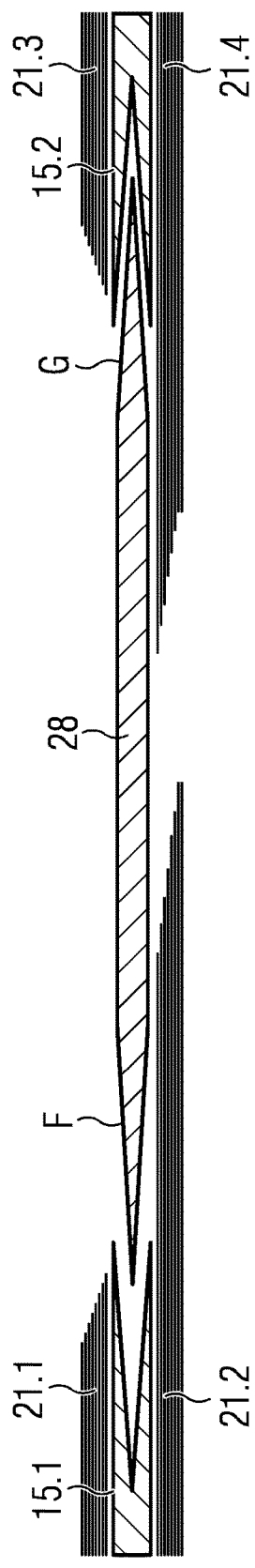
FIG. 14 shows a side perspective schematic view on a setup for performing a first phase of the method of manufacturing the structural element of the wind turbine blade of FIG. 2 according to a fourth embodiment of the invention.
Figure 15:
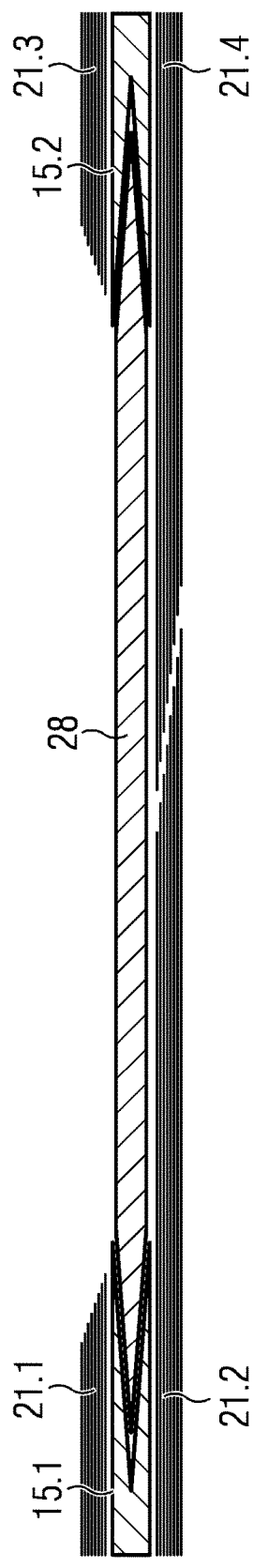
FIG. 15 shows the side perspective schematic view of FIG. 14 showing a second phase of the method of manufacturing the structural element of the wind turbine blade of FIG. 2 according to the fourth embodiment of the invention.
Figure 16:
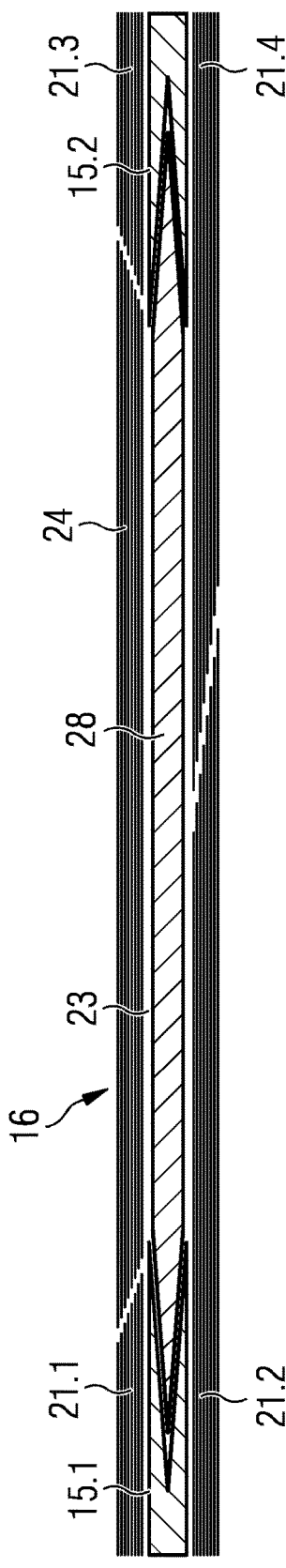
FIG. 16 shows the side perspective schematic view of FIG. 14 showing a third phase of the method of manufacturing the structural element of the wind turbine blade of FIG. 2 according to the fourth embodiment of the invention.

FIGS. 14 to 16 show a side perspective schematic view on a setup for performing a first, second and third phase of the method of manufacturing a structural element 15 of the wind turbine blade of FIG. 2 according to a fourth embodiment of the invention. This fourth embodiment may in particular refer to an alternative of the third embodiment for manufacturing the spar cap 15 of the wind turbine blade 10 according to FIGS. 9 to 11.

In this embodiment, the spar cap portions 15.1, 15.2 are provided with triangular shaped recesses conforming for form-fitting to V-shaped ends F, G of the intermediate piece 28. The laminates 21.2, 21.4 provided on the bottom sides of the spar cap portions 15.1, 15.2 are extending beyond the ends A, B of the spar cap portions 15.1, 15.2, whereas the laminates 21.1, 21.3 provided on the top sides of the spar cap portions 15.1, 15.2 terminate at the ends A, B of the spar cap portions 15.1, 15.2.

In the first phase, as shown in FIG. 14, the spar cap portions 15.1, 15.2 are arranged facing each other and the intermediate piece 28 is introduced therebetween.

In the second phase, as shown in FIG. 15, the intermediate piece 28 is form-fitted with the spar cap portions 15.1, 15.2, the intermediate piece 28 being provided with spacers 29 so as to provide space for the cavity 23. Further, the tapered ends of the laminates 21.2, 21.4 are fitted with each other.

In the third phase, as shown in FIG. 16, the intermediate piece 28 and the laminates 21.1, 21.3 are overlaminated by an overlaminate 24. Thereby, the cavity 23 between the intermediate piece 28, the spar cap portions 15.1, 15.2 and the laminates 21.1, 21.2, 21.3, 21.4, 24 is essentially closed and injection holes 25 may be provided in the overlaminate 24, for example, and adhesive 26 injected into the cavity 23 and cured therein to form the spar cap joint 16.

FIGS. 17 to 20 show a side perspective schematic view on a setup for performing a first, second, third and fourth phase of the method of manufacturing a structural element 15 of the wind turbine blade of FIG. 2 according to a fifth embodiment of the invention. This fifth embodiment may in particular refer to an alternative of the fourth embodiment for manufacturing the spar cap 15 of the wind turbine blade 10 according to FIGS. 14 to 16 or to an alternative of the third embodiment for manufacturing the spar cap 15 of the wind turbine 10 blade according to FIGS. 9 to 11.

In this embodiment, two intermediate pieces 28.1, 28.2 are provided having tapered ends. The spar cap portions 15.1, 15.2 have ends A, B tapered from both sides, top and bottom, or, in other words, the ends A, B of the spar cap portions 15.1, 15.2 form the shape of a spike.

In the first phase, as shown in FIG. 17, the first intermediate piece 28.1 is arranged underneath the tapered bottoms of the ends A, B of the spar cap portions 15.1, 15.2.

Figure 18:
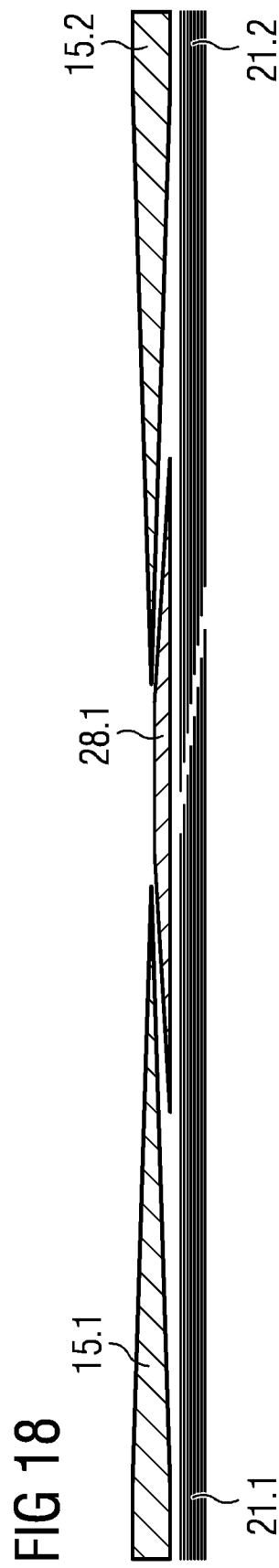
FIG. 18 shows the side perspective schematic view of FIG. 17 showing a second phase of the method of manufacturing the structural element of the wind turbine blade of FIG. 2 according to the fifth embodiment of the invention.

In the second phase, as shown in FIG. 18, the spar cap portions 15.1, 15.2 are moved relative towards each other so as to enclose the first intermediate piece 28.1

Figure 19:
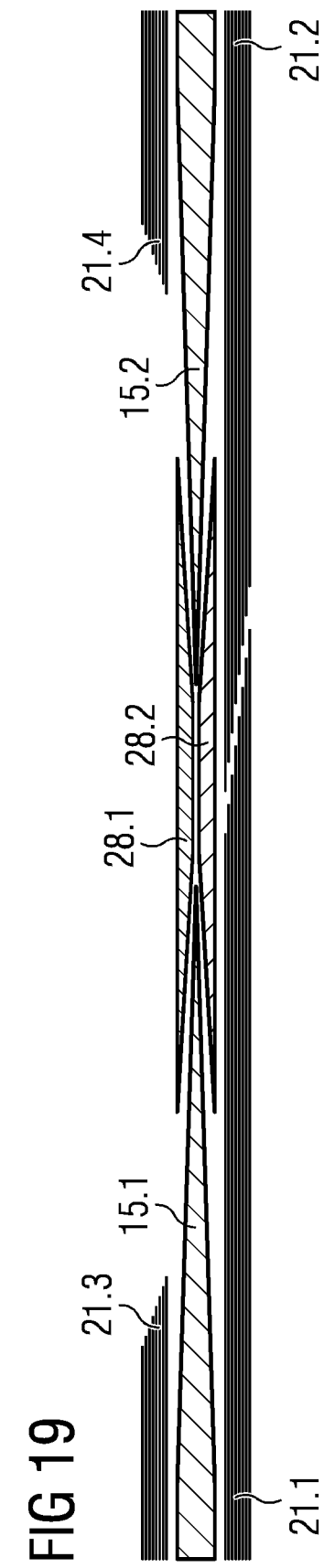
FIG. 19 shows the side perspective schematic view of FIG. 17 showing a third phase of the method of manufacturing the structural element of the wind turbine blade of FIG. 2 according to the fifth embodiment of the invention.

In the third phase, as shown in FIG. 19, the second intermediate piece 28.2 is arranged on top of the tapered tops of the ends A, B of the spar cap portions 15.1, 15.2 and the first intermediate piece 28.1.

In the fifth phase, as shown in FIG. 20, an overlaminate 24 is laminated onto the second intermediate piece 28.2 and the laminates 21.3, 21.4. Adhesive is now injected into the formed cavity 23 through injection holes 25, which may be provided in the overlaminate 24, for example, the adhesive being cured therein to form the spar cap joint 16.

FIG. 21 shows a side perspective schematic view on a structural element 15 manufactured according to a method of manufacturing the structural element 15 of the wind turbine blade 10 of FIG. 2 according to a sixth embodiment of the invention. In this embodiment, different from the fifth embodiment, the two intermediate pieces 28.1, 28.2 are of different size. Therefore, the geometry of the tapered ends A, B of the spar cap portions 15.1, 15.2 has also changed. The top and bottom of the tapering of the ends A, B of the spar cap portions 15.1, 15.2 are non-symmetric, whereas in the fifth embodiment they are symmetric.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for manufacturing a structural element of a wind turbine blade, the method comprising:
   (a) providing a first portion of the structural element and a second portion of the structural element, whereby each of the first portion and the second portion comprise a core material;
   (b) arranging an end of the core material of the first portion to face an end of the core material of the second portion, whereby a gap is formed between the end of the core material of the first portion and the end of the core material of the second portion;
   (c) providing laminates on top sides of the core materials of the first portion and the second portion and on bottom sides of the core materials of the first portion and the second portion, whereby a cavity enclosing the gap is formed between the end of the core material of the first portion, the end of the core material of the second portion and at least two of the laminates;
   (d) forming at least one injection hole in at least one of the laminates, so that the at least one injection hole is fluidically connected to the cavity;
   (e) injecting adhesive through the at least one injection hole into the cavity, curing the adhesive injected into the cavity and thereby forming a structural joint between the end of the core material of the first portion and the end of the core material of the second portion; and
   (f) arranging at least one intermediate piece connecting the end of the core material of the first portion with the end of the core material of the second portion, wherein the at least one intermediate piece comprises spacers on a surface, whereby the spacers create space for the cavity between the intermediate piece and the end of the core material of the first portion and between the intermediate piece and the end of the core material of the second portion.

2. The method according to claim 1, wherein the joint is a scarf joint or a butt joint.

3. The method according to claim 1, wherein at least one of the laminates is tapered at an end to form a lip.

4. The method according to claim 1, wherein at least one of the laminates extends beyond the end of the core material on which the at least one of the laminates is provided.

5. The method according to claim 1, wherein during the injection of the adhesive, an adhesive stopper is provided adjacent to the laminate provided on the bottom side of the core material of the first portion and the laminate provided on the bottom side of the core material of the second portion.

6. The method according to claim 1, wherein the step of providing the laminates includes
   overlaminating a laminate on the laminates provided on the top sides of the core materials of the first portion and the second portion, so that the overlaminated laminate connects the laminates provided on the top sides of the core materials of the first portion and the second portion with each other, and/or
   overlaminating a laminate on the laminates provided on the bottom sides of the core materials of the first portion and the second portion, so that the overlaminated laminate connects the laminates provided on the bottom sides of the core materials of the first portion and the second portion with each other.

7. The method according to claim 1, wherein the at least one intermediate piece is tapered at ends, and that the end of the core material of the first portion and the end of the core material of the second portion are tapered correspondingly to the ends of the intermediate piece for fitting therewith.

8. The method according to claim 1, wherein two separate intermediate pieces are being arranged to connect the end of the core material of the first portion with the end of the core material of the second portion.

9. The method according to claim 1, wherein the first portion and the second portion are shell portions, spar web portions and/or spar cap portions.

10. A method for manufacturing a wind turbine blade, whereby the method comprises the method for manufacturing a structural element of the wind turbine blade according to claim 1, by means of which at least two of a shell, a spar web and a spar cap of the wind turbine blade are manufactured and joined together using overlamination and/or adhesive injection.

11. A structural element of a wind turbine blade manufactured by means of the method according to claim 1, whereby the structural element is a shell, a spar web or a spar cap.

12. A wind turbine blade comprising at least one structural element according to claim 11.

13. A method for manufacturing a structural element of a wind turbine blade, the method comprising:
   (g) providing a first portion of the structural element and a second portion of the structural element, whereby each of the first portion and the second portion comprise a core material;
   (h) arranging an end of the core material of the first portion to face an end of the core material of the second portion, whereby a gap is formed between the end of the core material of the first portion and the end of the core material of the second portion;
   (i) providing laminates on top sides of the core materials of the first portion and the second portion and on bottom sides of the core materials of the first portion and the second portion, whereby a cavity enclosing the gap is formed between the end of the core material of the first portion, the end of the core material of the second portion and at least two of the laminates;
   (j) forming at least one injection hole in at least one of the laminates, so that the at least one injection hole is fluidically connected to the cavity;
   (k) injecting adhesive through the at least one injection hole into the cavity, curing the adhesive injected into the cavity and thereby forming a structural joint between the end of the core material of the first portion and the end of the core material of the second portion; and
   arranging at least one intermediate piece connecting the end of the core material of the first portion with the end of the core material of the second portion, wherein the at least one intermediate piece comprises spacers on a surface, wherein ends of the at least one intermediate piece are being fitted into corresponding recesses of the end of the core material of the first portion and the end of the core material of the second portion.

14. The method according to claim 13, wherein the joint is a scarf joint or a but joint.

15. The method according to claim 13, wherein at least one of the laminates is tapered at an end to form a lip.

16. The method according to claim 13, wherein at least one of the laminates extends beyond the end of the core material on which the at least one of the laminates is provided.

17. The method according to claim 13, wherein during the injection of the adhesive, an adhesive stopper is provided adjacent to the laminate provided on the bottom side of the core material of the first portion and the laminate provided on the bottom side of the core material of the second portion.

18. The method according to claim 13, wherein the step of providing the laminates includes
- overlaminating a laminate on the laminates provided on the top sides of the core materials of the first portion and the second portion, so that the overlaminated laminate connects the laminates provided on the top sides of the core materials of the first portion and the second portion with each other, and/or
- overlaminating a laminate on the laminates provided on the bottom sides of the core materials of the first portion and the second portion, so that the overlaminated laminate connects the laminates provided on the bottom sides of the core materials of the first portion and the second portion with each other.

19. A structural element of a wind turbine blade manufactured by means of the method according to claim 13, whereby the structural element is a shell, a spar web or a spar cap.

\* \* \* \* \*